US009444278B2

(12) United States Patent
Baurle

(10) Patent No.: US 9,444,278 B2
(45) Date of Patent: Sep. 13, 2016

(54) USB CHARGING WITH DATA COMMUNICATION

(71) Applicant: Power Integrations, Inc., San Jose, CA (US)

(72) Inventor: Stefan Baurle, San Jose, CA (US)

(73) Assignee: Power Integrations, Inc., San Jose, CA (US)

(*) Notice: Subject to any disclaimer, the term of this patent is extended or adjusted under 35 U.S.C. 154(b) by 223 days.

(21) Appl. No.: 14/261,873

(22) Filed: Apr. 25, 2014

(65) Prior Publication Data

US 2014/0320075 A1    Oct. 30, 2014

Related U.S. Application Data

(60) Provisional application No. 61/817,094, filed on Apr. 29, 2013.

(51) Int. Cl.
*H02J 7/00* (2006.01)
*G06F 13/42* (2006.01)

(52) U.S. Cl.
CPC ......... *H02J 7/0042* (2013.01); *G06F 13/4282* (2013.01); *H02J 7/0052* (2013.01); *G06F 2213/0042* (2013.01); *H02J 2007/0062* (2013.01); *H02J 2007/0098* (2013.01)

(58) Field of Classification Search
CPC ............... H02J 7/0042; H02J 7/0052; H02J 2007/0062; H02J 2007/0098; G06F 13/4282; G06F 2213/0042
USPC ....................................................... 320/108
See application file for complete search history.

(56) References Cited

U.S. PATENT DOCUMENTS

| 7,378,817 B2 * | 5/2008 | Calhoon | G06F 1/26 320/106 |
| 2011/0016341 A1 * | 1/2011 | Tom | G06F 1/266 713/340 |

(Continued)

FOREIGN PATENT DOCUMENTS

| EP | 2387125 A2 | 11/2011 |
| EP | 2584471 A1 | 4/2013 |

OTHER PUBLICATIONS

"Battery Charging Specification", version 1.2, USB Implementers Forum, Inc., Dec. 7, 2010. (http://www.usb.org/developers/devclass.sub.--docs/BCv1.2.sub.--011- 912.zip).*

(Continued)

*Primary Examiner* — Jack Chiang
*Assistant Examiner* — Brandon Bowers
(74) *Attorney, Agent, or Firm* — Blakely Sokoloff Taylor & Zafman LLP

(57) ABSTRACT

A process is disclosed for communicating digital data between a powered device and a charging device via a universal serial bus (USB). The process includes conducting a handshaking period between the powered device and the charging device via the USB. The powered device initiates a mode of normal operation of the charging device after an end of the handshaking period. The charging device communicates digital data (e.g., available power levels) between the powered device and the charging device during a time period that starts with the end of the handshaking period and ends with a beginning of the mode of normal operation.

23 Claims, 5 Drawing Sheets

(56) References Cited

U.S. PATENT DOCUMENTS

2012/0166173 A1* 6/2012 Fischbach ............... G06F 1/266
  703/28
2013/0238819 A1* 9/2013 Oljaca ................. G06F 13/4081
  710/15

OTHER PUBLICATIONS

PCT/US2014/035728—PCT International Search Report and Written Opinion, mailed Jul. 8, 2014 (10 pages).
"Universal Serial Bus Specification Revision 2.0", Universal Serial Bus Specification, No. Rev. 2.0, Apr. 27, 2000, XP001544046, paragraph [9.1.2]; figures 9-1 (Part 1: pp. i-xxviii and 1-297).
"Universal Serial Bus Specification Revision 2.0", Universal Serial Bus Specification, No. Rev. 2.0, Apr. 27, 2000, XP001544046, paragraph [9.1.2]; figures 9-1 (Part 2: pp. 298-622).
Remple Terry: "Battery charging specification", Apr. 15, 2009, No. Revision 1.1, Apr. 15, 2009, pp. I-VI, 1, XP002676116, Retrieved from the Internet: URL: http://www.usb.org/developers (pp. i-vi and 1-38).
Len Sherman: "The Basics of USB Battery Charging: a Survival Guide", Dec. 9, 2010, XP055047785, Retrieved from the Internet: URL: http://www.maximintegrated.com/app-notes/index.mvp/id/4803 [retrieved on Dec. 13, 2012] (14 pages).
"CHY100 ChiPhy™ Family, Charger Interface Physical Layer IC," Power Integrations, Inc., Mar. 2014, pp. 1-6.

* cited by examiner

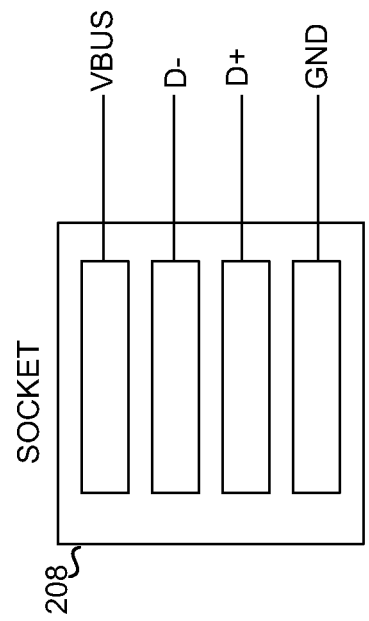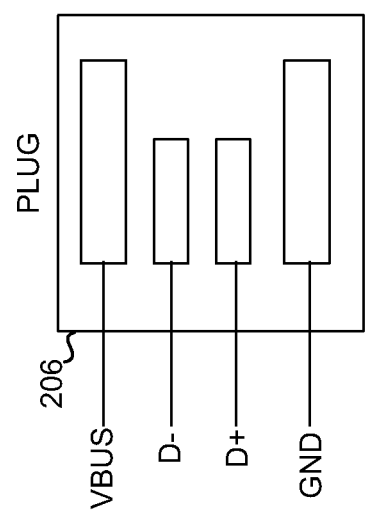
FIG. 2

USB CHARGING WITH DATA COMMUNICATION

CROSS-REFERENCE TO RELATED APPLICATION

This application claims the benefit of U.S. Provisional Application No. 61/817,094, filed Apr. 29, 2013.

TECHNICAL FIELD

This disclosure is related to providing power to devices over a standard data bus. Specifically, it is related to data communication between a charging device, including a power supply, and a powered device over a cable that provides power to the powered device.

BACKGROUND

Standards have been adopted to provide power to a mobile powered device (PD) through a Universal Serial Bus (USB) cable. The PD typically includes a rechargeable battery, and the power supply typically charges the battery in addition to providing power to operate the device. The power supply is often known as a charging device. A standard for providing power to a PD is the USB Battery Charging Specification 1.2 that defines signals and protocols that allow the charging device and the PD to communicate for the purpose of differentiating between a Standard Downstream Port (SDP), a Charging Downstream Port (CDP) or a Dedicated Charging Port (DCP). In some applications it may be desirable for the PD to obtain additional information from the charging device that may not be addressed in the charging specification, while maintaining compliance with the specification.

BRIEF DESCRIPTION OF DRAWINGS

Non-limiting and non-exhaustive embodiments of the present invention are provided in the following figures, wherein like reference numerals refer to like parts throughout the various views unless otherwise specified.

FIG. 2 is pinout diagram illustrating the interconnections of the USB socket and plug.

Figure 1:
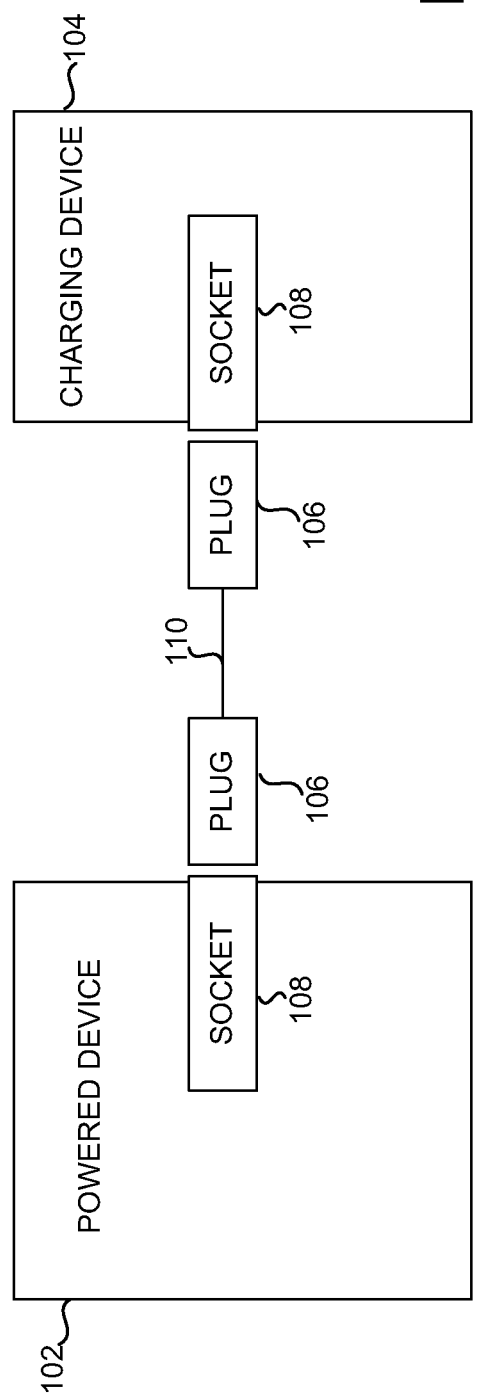
FIG. 1 is a block diagram illustrating a powered device coupled to a charging device by a USB plug, in accordance with the teachings of the present disclosure.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

FIG. 1 is a functional block diagram illustrating a powered device (PD) 102 coupled to ac-to-dc power supply charging device 104 by a Universal Serial Bus (USB) cable 110. PD 102 contains a USB socket 108. Charging device 104 also contains a USB socket 108. USB socket 108 is configured to receive VBus, D+, D−, and ground signals through the USB cable 110 when the plug is inserted into the socket.

FIG. 2 is a pinout diagram of the USB plug and socket. Plug 206 contains VBus, D+, D−, and ground pins. Socket 208 contains VBus, D+, D−, and ground pin. In one implementation, the USB plug and socket may also contain an additional ID pin (not shown) to determine the type of USB plug. In operation, plug 206 connects to socket 208 with the matching pin. Power is transferred from the charging device 104 to PD 102 through the Vbus and a return path to a ground pin. In one example, the charging device 104 may supply 5 watts of power, or 5 volts at 1 ampere. PD 102 may communicate with the charging device by using the D+, and D− pins. The signals D+/D− are in reference to the ground pin of the USB plug and socket.

Figure 3:
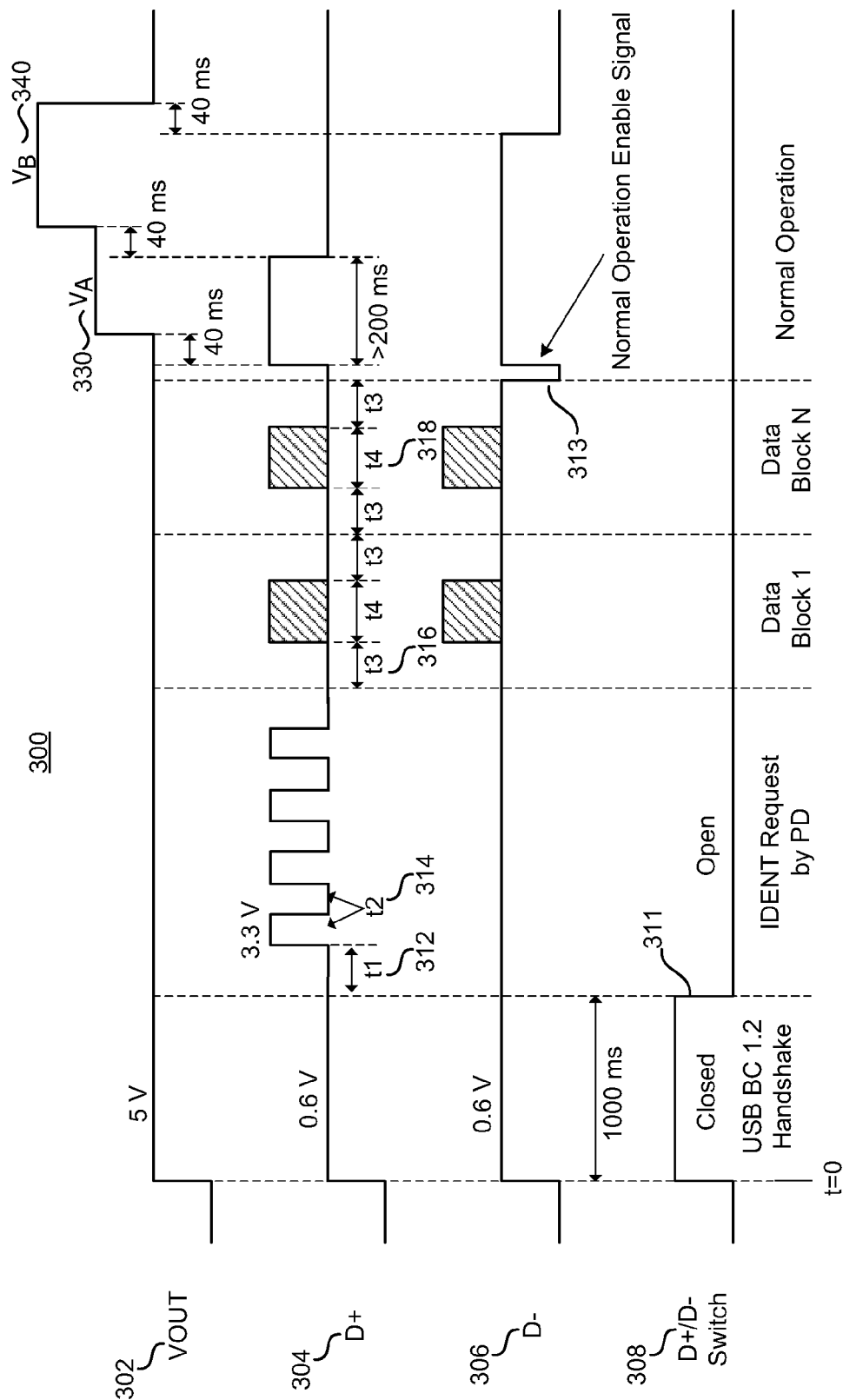
FIG. 3 is an example timing diagram illustrating a process of communicating digital data between a powered device and a charging device, in accordance with the teachings of the present disclosure.

The example timing diagram 300 of FIG. 3 shows signals on a Universal Serial Bus (USB) that add communication between a charging device 104 and a PD 102 while keeping compliance with existing USB Battery Charging Specification 1.2. The communication uses existing USB data lines D+ 304 and D− 306. The USB data lines can be used to exchange proprietary data, such as, to identify an authorized adapter or to communicate available output voltage(s), current(s), power or special functions, in accordance with embodiments of the present disclosure. The proprietary data are exchanged in intervals t1,t2,t3,t4 and are bounded by the end of an initial handshake period and the beginning of a default operation enable signal. The specific time periods shown in FIG. 3 are only one possible implementation of an embodiment of the present disclosure.

After initial contact at t=0 between the USB socket (typically USB Type A in the charger) and a USB cable the charging device closes a switch between D+/D− 308 (short circuit) for 1000 milliseconds. This provides full backwards compatibility to the existing USB Battery Charging specification 1.2. During this initial handshaking period, the USB BC 1.2 handshake (Data Contact Detect, 1st and 2nd Detection) takes place. The handshaking period includes determining if the attached charging device is a standard downstream port (SDP), Charging Downstream Port (CDP), or a dedicated charging port (DCP). No digital communication occurs with a DCP.

After the end 311 of the handshaking period, the switch between D+/D− 308 is opened and the charging device starts (or continues) monitoring both data lines. In the illustrated example, the beginning 313 of the normal mode of operation does not commence until an enable signal has been detected by the charging device.

In the example of FIG. 3, the enable signal is a logic low signal on D− 306. In another example, the enable signal could be a signal pattern on D+ 304 and/or D− 306. Once the D+/D switch 308 is opened the PD 102 will send a special IDENT request to the charging device, in accordance with an embodiment of the present disclosure.

In the example of FIG. 3 the IDENT request is a sequence of four voltage level toggles on D+ 304. In the voltage levels shown, D+ 304 use existing USB voltage levels 3.3 V. The IDENT signal could also use different voltage levels or patterns. The IDENT request signal could also be sent via D− 306 or on both data lines either in phase or out of phase. In one example, the charging device may identify the specific PD (e.g., manufacturer and/or model no.) based on the IDENT request signal. In another example, the charging device may identify a class of the powered device (e.g., 5 W smart phone, 10 W tablet, etc.). In one embodiment, the charging device may only provide power to the powered device if the powered device is an approved specific and/or class of a device. In yet another example, the powered device may send the IDENT request to the charging device to indicate that the powered device is capable of communicating additional digital data before the start of normal operation.

Once the charging device has detected the IDENT request signal it will start sending predefined data using predefined timing(s) such as the examples of t1 312, t2 314, t3 316, t4 318. As mentioned above, the charging device may determine that the powered device is capable of communicating digital data prior to the start of normal operation in response to the IDENT request. Thus, if no IDENT request is received, or if an IDENT request is received, but the powered device is not an approved device, then the charging device may refrain from sending the digital data. Even still, in another example, the charging device may refrain from providing power to the powered device if the powered device is not an approved device. In yet another example, the content of the digital data communicated by the charging device may be dependent what type of powered device is identified.

The predefined timing of t1 312 may command the charging device to send digital data in a time interval of t3 316. The predefined timing of t2 314 may vary from a first voltage toggle to the next voltage toggle. These predefined digital data may be proprietary digital data established between a manufacturer of the PD and the manufacturer of the charger. In the example of FIG. 3, the digital data are sent in blocks of two bits using existing USB voltage levels of 0.6 V and 3.3 V. For example, the first digital data block could provide authentication information. The second digital data block could provide information on available output voltage(s). Subsequent digital data blocks could provide information on available output current and output power at a given output voltage. Additional digital data blocks also could provide information on special functions or information such as for example a thermal shutdown threshold, or for example a manufacturing date. The digital data blocks may be transmitted in any order in accordance with embodiments of the present disclosure.

Once the predefined data have been received by the PD 102, the PD 102 may commence with default operation by providing an enable signal to the charging device 104. In the example of FIG. 3, the enable signal is a logic low signal on D− 306. After the charging device has detected the enable signal, the mode of normal operation commences. This could be for instance a default operation at 5 V. Alternatively, it could accept commands to change the output voltage, current, or power by means of voltage levels such as $V_A$ 330 and $V_B$ 340 presented by the PD 102 over the data lines D+/D−.

In other words, it is not necessary for the PD 102 to provide an enable signal to the charger for the PD 102 to receive power from the charging device 104. The charging device 104 continues to provide 5 V to the PD in the absence of an enable signal unless the PD 102 commands the charger to change the output voltage. As an alternative to an enable signal that marks the start of normal operation, the PD 102 may command the charging device 104 to change the output voltage, current, or power after the PD 102 receives digital data from the charging device that communicates the capabilities of the charger to the PD 102.

Figure 4:
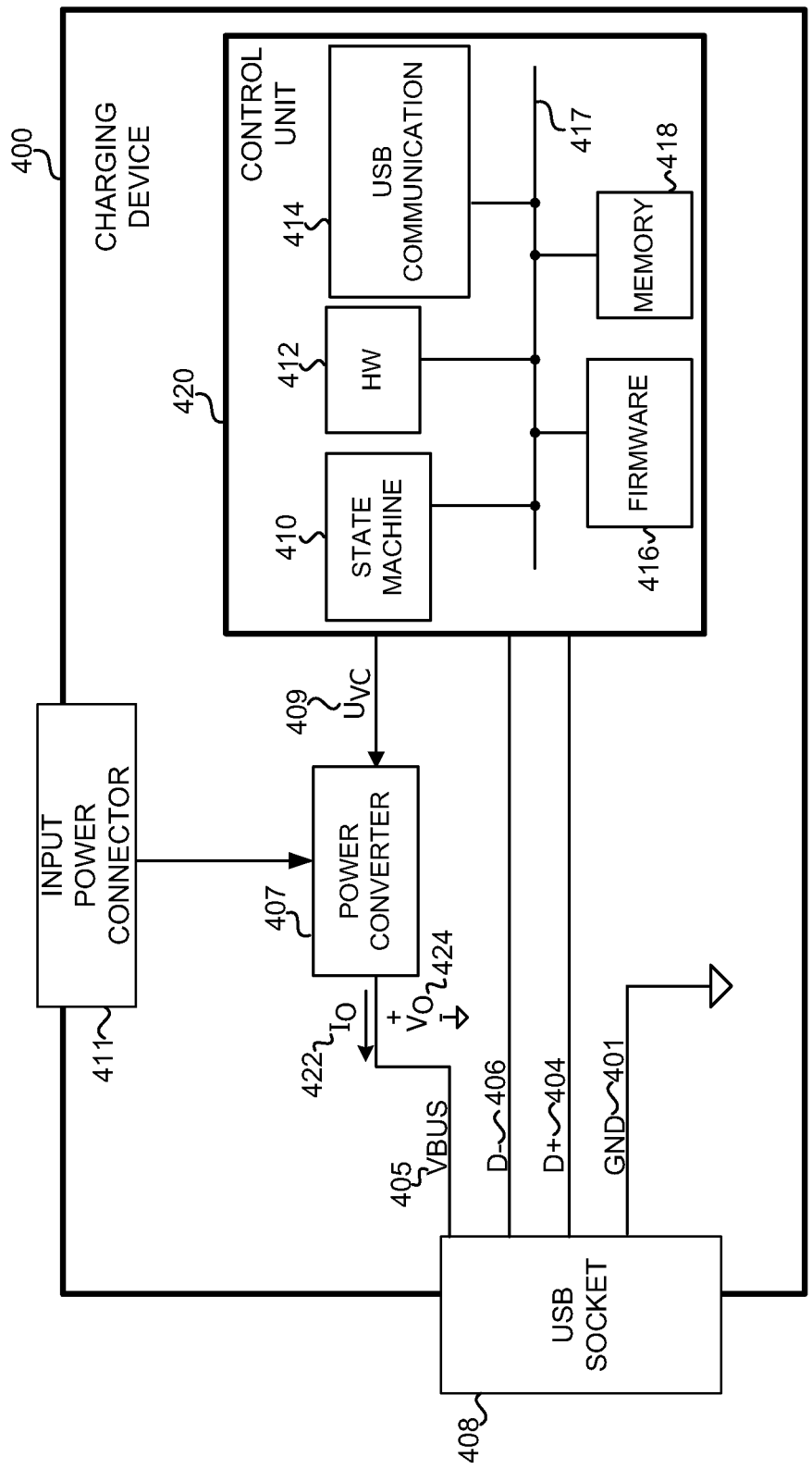
FIG. 4 is a functional block diagram illustrating an example charging device, in accordance with the teachings of the present disclosure.

FIG. 4 is an example functional block diagram illustrating the charging device 400, in accordance with the teachings of the present disclosure. Charging device 400 is one possible implementation of charging device 104 of FIG. 1. The illustrated example of the charging device 400 includes a control unit 420, input power connector 411, power converter 407, and a USB socket 408. Control unit 420 includes a state machine 410, hardware 412, USB communication 414, firmware 416, bus 417, and memory 418.

Charging device 400 may be capable of bidirectional communication of USB signals D− 406 and D+ 404 to the PD through the USB socket 408. Control unit 420 processes the request from the PD. Control unit 420 may respond with the requested digital data for the PD. Control unit 420 may also control power converter 407. Power converter 407 receives power from an input power connector 411. Power converter 407 supplies power to the PD through $V_{BUS}$ 405 and ground 401 terminals. The voltage $V_O$ 424 and current $I_O$ 422 on $V_{BUS}$ 405 may vary depending on the voltage control signal $U_{VC}$ 409.

Control unit 420 includes a USB communication module 414 for performing the digital communication processes (e.g., process 500) described herein. USB communication module 414 is illustrated separately and separate from state machine 410 for clarity, but may be a single unit and/or implemented in the state machine 410. State machine 410, as well as USB communication module 414 can, but need not necessarily include, one or more microprocessors, embedded processors, controllers, application specific integrated circuits (ASICs), advanced digital signal processors (ADSPs), and the like. The term state machine describes the functions implemented by the system rather than specific hardware. Moreover, as used herein the term "memory"

refers to any type of computer storage medium, including long term, short term, or other memory associated with charging device 400, and is not to be limited to any particular type of memory or number of memories, or type of media upon which memory is stored. In one embodiment, state machine 410 includes a processor that executes instructions included in the software stored in memory 418 and/or firmware 416.

The processes described herein may be implemented by various means depending upon the application. For example, these processes may be implemented in hardware 412, firmware 416, software stored in memory 418, or any combination thereof. For a hardware implementation, the state machine 410 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the processes may be implemented with modules (e.g., procedures, functions, and so on) that perform the functions described herein. Any computer-readable medium tangibly embodying instructions may be used in implementing the processes described herein. For example, program code may be stored in memory 418 and executed by a processor. Memory 418 may be implemented within or external to the processor. In one embodiment, memory 418 may also be used for one time programming (OTP). Thus, memory 418 may be programmed by, for example, a manufacturer to store adapter specific information such as authentication information, power levels, etc. during production line testing.

If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer.

Descriptions of state machine 410, hardware 412, and/or USB communication module 414 may be generated and compiled for incorporation into other integrated circuits. For example, behavioral level code describing USB communication module 414, or portions thereof, may be generated using a hardware descriptive language, such as VHDL or Verilog, and stored to a machine-readable storage medium. Furthermore, the behavioral level code can be compiled into register transfer level ("RTL") code, a netlist, or even a circuit layout and stored to a machine-readable storage medium. The behavioral level code, the RTL code, the netlist, and the circuit layout all represent various levels of abstraction to describe USB communication module 414. By way of example, and not limitation, such computer-readable media can comprise RAM, ROM, Flash Memory, EEPROM, CD-ROM or other optical disk storage, magnetic disk storage or other magnetic storage devices, or any other medium. Combinations of the above should also be included within the scope of computer-readable media.

Figure 5:
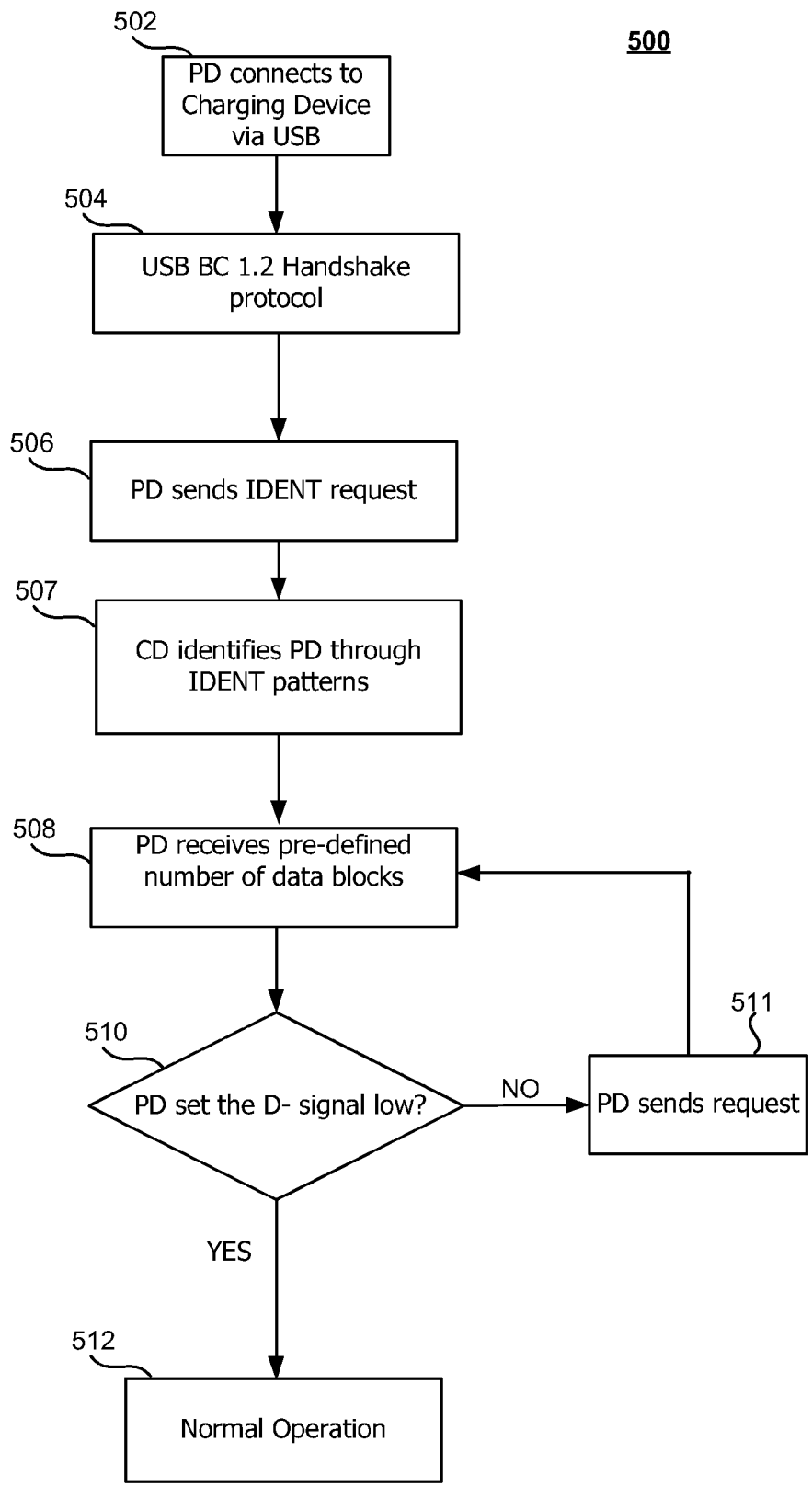
FIG. 5 is a flowchart illustrating an example process for a powered device to communicate with the charging device, in accordance with the teachings of the present disclosure.

FIG. 5 is a flowchart illustrating an example process 500 for a PD 102 to communicate with the charging device as described in FIG. 4. At block 502, PD 102 connects to the charging device 104 through the USB cable. At block 504, the USB BC 1.2 handshake protocol begins. With the end of the handshaking period, the D+/D− switch 308 is opened, example process 500 proceeds to process block 506. At process block 506, the PD 102 sends an IDENT request to the charging device 104. The charging device identifies the specific PD based on the IDENT request pattern. At process block 508, the charging device 104 sends a pre-defined number of data blocks to the PD 102 based on the IDENT request pattern. At conditional block 510, the PD may enable normal operation after the request has been received by setting D− low. If the D− signal is not low, conditional block 510 proceeds to process block 511 and the PD 102 may request additional digital data. Process block 511 loops back to process block 508. If the D− signal is low, conditional block 510 proceeds to process block 512 and the mode of normal operation of the PD 102 ensues.

What is claimed is:

1. A method of communicating digital data between a powered device and a charging device via a universal serial bus (USB), the method comprising:
   conducting a handshaking period between the powered device and the charging device via the USB;
   receiving a pattern of voltage level toggles on at least one data conductor of the USB from the powered device after the end of the handshaking period;
   beginning the communication of the digital data in response to the received pattern of voltage level toggles, wherein communicating the digital data between the powered device and the charging device via the USB occurs during a time period that starts with the end of the handshaking period and ends with a beginning of a mode of normal operation, wherein the digital data includes authentication information to allow the charging device to provide power to the powered device and includes information about a magnitude of the power; and
   initiating the mode of normal operation of the charging device that includes the charging device providing the power to the powered device from a power supply included in the charging device via the USB after an end of the handshaking period.

2. The method of claim 1, wherein the handshaking period includes detecting attachment of the powered device with the charging device via the USB.

3. The method of claim 2, wherein the handshaking period includes the powered device determining whether the charging device is a port selected from the group consisting of a standard downstream port (SDP), a charging downstream port (CDP), and a dedicated charging port (DCP).

4. The method of claim 1, wherein initiating a mode of normal operation of the charging device includes receiving an enable signal from the powered device via the USB.

5. The method of claim 1, wherein the USB includes a first data conductor, a second data conductor, a first power conductor, and a second power conductor, the method further comprising the charging device shorting the first data conductor and the second data conductor together during the handshaking period.

6. The method of claim 1, further comprising identifying the powered device in response to the pattern of voltage level toggles.

7. The method of claim 1, wherein communicating the digital data includes the charging device communicating one or more voltage levels that the power supply is capable of outputting to the powered device via the USB.

8. The method of claim 1, wherein communicating the digital data includes the charging device communicating one or more current levels that the power supply is capable of outputting to the powered device via the USB.

9. The method of claim 1, wherein communicating the digital data includes the charging device communicating one or more power levels that the power supply is capable of outputting to the powered device via the USB.

10. A non-transitory machine-readable medium including program code stored thereon for communicating digital data between a powered device and a charging device via a universal serial bus (USB), the program code comprising instructions to:
   conduct a handshaking period between the powered device and the charging device via the USB;
   receive a pattern of voltage level toggles on at least one data conductor of the USB from the powered device after the end of the handshaking period;
   begin the communication of the digital data in response to the received pattern of voltage level toggles, wherein communicating the digital data between the powered device and the charging device via the USB occurs during a time period that starts with the end of the handshaking period and ends with a beginning of a mode of normal operation, wherein the digital data includes authentication information to allow the charging device to provide power to the powered device and includes information about a magnitude of the power; and
   initiate the mode of normal operation of the charging device that includes the charging device providing the power to the powered device from a power supply included in the charging device via the USB after an end of the handshaking period.

11. The medium of claim 10, wherein the handshaking period includes the detection of the attachment of the powered device with the charging device via the USB.

12. The medium of claim 10, wherein the handshaking period includes determining whether the charging device is a port selected from the group consisting of a standard downstream port (SDP), a charging downstream port (CDP), and a dedicated charging port (DCP).

13. The medium of claim 10, wherein the instructions to initiate the mode of normal operation of the charging device includes instructions to receive the enable signal from the powered device via the USB.

14. The medium of claim 10, wherein the USB includes a first data conductor, a second data conductor, a first power conductor, and a second power conductor, the medium further comprising instructions to short the first data conductor and the second data conductor together during the handshaking period.

15. The medium of claim 10, further comprising instructions to identify the powered device in response to the pattern of voltage level toggles.

16. The medium of claim 10, wherein the instructions to communicate the digital data includes instructions to communicate one or more voltage levels that the power supply is capable of outputting to the powered device via the USB.

17. The medium of claim 10, wherein the instructions to communicate the digital data includes instructions to communicate one or more current levels that the power supply is capable of outputting to the powered device via the USB.

18. The medium of claim 10, wherein the instructions to communicate the digital data includes instructions to communicate one or more power levels that the power supply is capable of outputting to the powered device via the USB.

19. A charging device, comprising:
   a Universal Serial Bus (USB) port;
   a power supply converter coupled to the USB port;
   a USB communication module configured to direct the charging device to:
      conduct a handshaking period between the powered device and the charging device via the USB port;
      receive a pattern of voltage level toggles on at least one data conductor of the USB from the powered device after the end of the handshaking period;
      begin communication of digital data in response to the received pattern of voltage level toggles, wherein communicating the digital data between the powered device and the charging device via the USB occurs during a time period that starts with the end of the handshaking period and ends with a beginning of a mode of normal operation, wherein the digital data includes authentication information to allow the charging device to provide power to the powered device and includes information about a magnitude of the power; and
      initiate the mode of normal operation of the charging device that includes the charging device providing the power to the powered device from the power supply via the USB port after an end of the handshaking period.

20. The charging device of claim 19, wherein the USB communication module is further configured to direct the charging device communicate one or more voltage levels that the power supply converter is capable of outputting to the powered device via the USB.

21. The charging device of claim 19, wherein the USB communication module is further configured to direct the charging device communicate one or more current levels that the power supply converter is capable of outputting to the powered device via the USB.

22. The charging device of claim 19, wherein the USB communication module is further configured to direct the charging device communicate one or more power levels that the power supply converter is capable of outputting to the powered device via the USB.

23. The charging device of claim 19, wherein the digital data includes authentication information to allow the charging device to vary the power to the powered device.

* * * * *